USOO5491773A

United States Patent [19]

Veldhuis et al.

[11] Patent Number: 5,491,773
[45] Date of Patent: Feb. 13, 1996

[54] ENCODING SYSTEM COMPRISING A SUBBAND CODER FOR SUBBAND CODING OF A WIDEBAND DIGITAL SIGNAL CONSTITUTED BY FIRST AND SECOND SIGNAL COMPONENTS

[75] Inventors: Raymond N. J. Veldhuis; Robbert G. Van Der Waal, both of Eindhoven, Netherlands

[73] Assignee: U.S. Philips Corporation, New York, N.Y.

[21] Appl. No.: 218,992

[22] Filed: Mar. 28, 1994

Related U.S. Application Data

[63] Continuation of Ser. No. 841,917, Feb. 25, 1992, abandoned.

[30] Foreign Application Priority Data

Sep. 2, 1991 [EP] European Pat. Off. ............ 91202221

[51] Int. Cl.⁶ ...................................................... G10L 9/00
[52] U.S. Cl. ........................ 395/2.38; 395/2.39; 395/2.14
[58] Field of Search ................................. 395/2.35–2.39, 395/2, 2.12, 2.14; 381/30, 36, 29, 37–42, 46–47

[56] References Cited

U.S. PATENT DOCUMENTS

| 4,142,071 | 2/1979 | Crochiere et al. | 395/2.38 |
|---|---|---|---|
| 4,184,049 | 1/1980 | Crochiere et al. | 395/2.38 |
| 4,688,246 | 8/1987 | Eilers et al. | 380/9 |
| 4,713,776 | 12/1987 | Araseki | 395/2.38 |
| 4,896,362 | 1/1990 | Veldhuis et al. | 381/30 |
| 5,105,463 | 4/1992 | Veldhuis et al. | 381/30 |
| 5,161,210 | 11/1992 | Druyvesteyn et al. | 381/31 |
| 5,214,678 | 5/1993 | Rault et al. | 375/122 |
| 5,341,457 | 8/1994 | Hall, II et al. | 395/2.35 |
| 5,367,608 | 11/1994 | Veldhuis et al. | 395/2.38 |

OTHER PUBLICATIONS

IEEE ICASSP 80, vol. 1, 327–331, Apr. 9–11, 1980, M. A. Krasner "The Critical Band Coder . . . Digital Encoding of Speech Signals Based on the Perceptual Requirements of the Auditory System".

Primary Examiner—Allen R. MacDonald
Assistant Examiner—Michael A. Sartori
Attorney, Agent, or Firm—David R. Treacy

[57] ABSTRACT

For subband coding of a signal such as a digital stereo signal, the digital signal is split into subbands each comprising at least first and second subband signal components. The subband signal components in a subband m are constituted by blocks of q samples each, represented by a certain number of bits ($n_{mr}$, $n_{ml}$). The number of bits is the result of allocation based on a determination of bit needs for blocks in each subband. A determination is made whether or not initially bits are to be allocated to a signal block of one component in a subband prior to the bit allocation, and irrespective of the bit need for that signal block. If it is determined that an initial bit allocation is required for a particular signal block in a subband, an initial bit allocation is also applied to at least a second corresponding signal block in that subband.

12 Claims, 6 Drawing Sheets

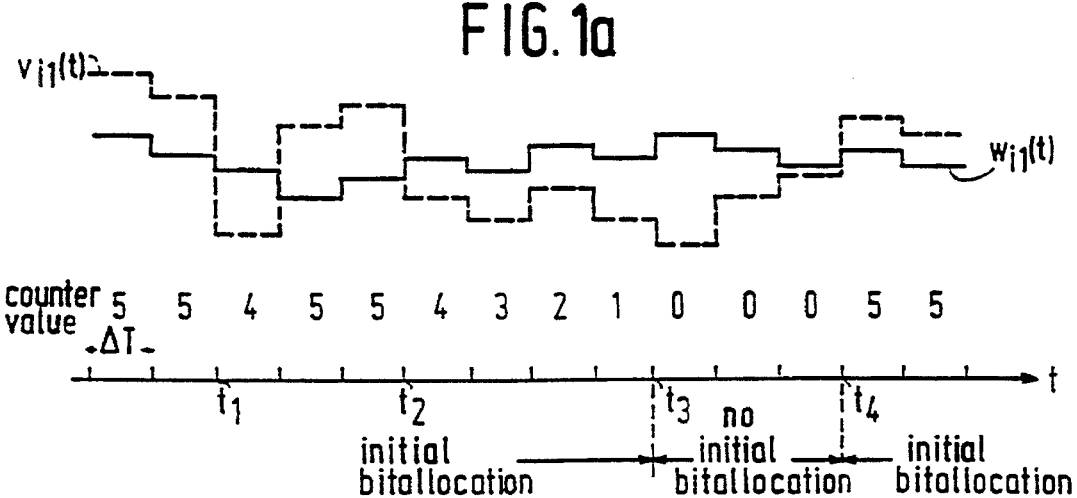
FIG. 1a
FIG. 3
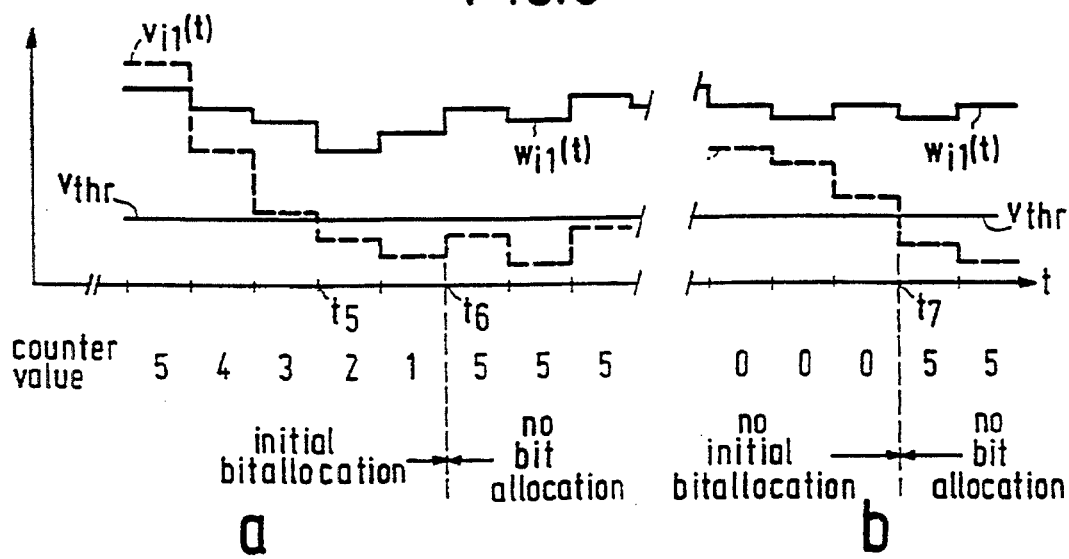
FIG. 4

ENCODING SYSTEM COMPRISING A SUBBAND CODER FOR SUBBAND CODING OF A WIDEBAND DIGITAL SIGNAL CONSTITUTED BY FIRST AND SECOND SIGNAL COMPONENTS

This is a continuation of application Ser. No. 07/841,917, filed Feb. 25, 1992, abandoned.

BACKGROUND OF THE INVENTION

The invention relates to an encoding system comprising a subband coder for subband coding of a wideband digital signal, for example, a digital stereo audio signal, constituted by at least first and second signal components which are sampled each with a specific sampling frequency $F_3$, the subband coder including signal splitting means for generating, in response to the wideband digital signal, a number of M subband signals by means of a sampling frequency reduction, for which purpose the splitting means split up the wideband signal into successive subbands having band numbers m which augment with frequency, where $m=1 \leq m \leq M$, and in which each subband signal is constituted by at least first and second subband signal components, the encoding system further including quantizing means for quantizing block-by-block the first and second subband signal components in a subband $SB_m$, a quantized subband signal component comprising successive signal blocks, each signal block containing q samples, the q samples in corresponding signal blocks of the first and second quantized subband signal components in the subband $SB_m$ being represented by $n_{m1}$ and $n_{m2}$ bits respectively, the quantizing means to this end comprising bit need determining means for determining a bit need b for corresponding signal blocks in the subbands, which bit need is related to the number of bits by which the samples in a signal block in a subband SB should be represented, and the quantizing means including bit allocation means for allocating the available quantity of bits to samples in the different signal blocks in the subbands in response to the bit needs as they are determined in the bit need determining means so as to obtain the values $n_{m1}$ and $n_{m2}$ for the corresponding signal blocks in the subband $SB_m$.

Such an encoding system is known from European Patent Application No. 289.080 (to which U.S. Pat. No. 4,896,362 corresponds) document (1) in the reference list. Dutch Patent Application No. 90.01.127 (to which U.S. patent application Ser. No. 07/620,971 corresponds, abandoned; and U.S. patent application Ser. No. 08/144,092 which is an indirect continuation thereof, corresponds), document (6a) in the reference list, further describes how the bit allocation in such an encoding system may be realised. A single subband signal in each of the subbands, for example, a mono signal or two or more signals in each of the subbands may be concerned. With two signals one may think of a stereo signal, with three signals one may think of a left, central, right signal and with four signals one may think of a quadraphonic signal.

SUMMARY OF THE INVENTION

It is an object of the invention to improve the bit allocation for the coding of a subband signal constituted by two or more subband signal components in each of the subbands.

According to the invention the encoding system is thereto characterized in that the quantizing means comprise determining means, which determining means are arranged for determining for a signal block of the first subband signal component in the subband $SB_m$, whether an initial allocation of a number of bits to the samples in the signal block is to be performed in the bit allocation means irrespective of the bit need belonging to the signal block and determined in the bit need determining means, and are arranged for producing a first control signal in response thereto, and in that the bit allocation means are arranged for initially allocating a number of bits to the samples of the signal block in response to the first control signal, and also for initially allocating a number of bits to the samples of the corresponding signal block of at least the second subband signal component in the subband $SB_m$, irrespective of the bit need of the corresponding signal block of at least the second subband signal component. In aforementioned Dutch Patent Application, document (6a), there has been described that in the bit allocation step bits may be allocated to a signal block in advance. This achieves that this signal block containing at least the number of bits allocated thereto in the initial bit allocation step can be coded with certainty. It has not been described how, when coding, for example, a stereo signal in which first and second subband signal components are located in a subband, the initial bit allocation for the two subband signal components may be realised. Said Dutch Patent Application only describes for a single subband signal the manner in which it can be determined whether or not initial bit allocation is necessary on the basis of the power $v_i(t)$ of a signal block, the masked quantizing power $w_i(t)$ of the signal block and the bit allocation procedure for previous signal blocks of the subband signal.

According to the invention, interaction is now realised between determining initial bit allocation for corresponding signal blocks in a subband, in the way that if there is a determination that initial bit allocation is necessary for one of the corresponding signal blocks, bits are also initially allocated to at least a second corresponding signal block. One preferably allocates in advance equally many bits to the two or more signal blocks. Experiments have shown that such an interaction provides improved auditory perception of the encoded signals.

In addition, if there is a possibility of establishing whether no bits whatsoever need be allocated to a subband signal during bit allocation, there are in fact three options. In this situation, the determining means may now determine that (a) bits are to be allocated initially, or (b) bits are not to be allocated initially, or (c) no bits at all are to be allocated during the bit allocation procedure. The invention as described hereinbefore thus assumes that if the situation (a) occurs for at least one of the subband signal components, bits are to be allocated in advance to at least two subband signal components. This is to say, that the main concept is based on the supposition that there is at least interaction for the case where the situation (a) occurs for one of the corresponding subband signal components in a subband.

This concept of interaction may also be applied for situation (b) as required. Let us assume that for at least two corresponding subband signal components the situation (b) occurs for at least one of the subband signal components, whereas the situation (a) does not occur for any of the signal components, bits will then be allocated to all these subband signal components in the manner described in document (6a).

For the quantization step the first and second subband signal components are put together to form a combined subband signal for subbands to be coded in the intensity mode. There are various ways in which the two subband signal components may be combined. For a description of this combining of the two subband signal components in a subband reference be made to Dutch Patent Application No.

91.00.173 (to which U.S. patent application Ser. No. 07/829, 789 corresponds), document (3). Also for this combined subband signal an initial bit allocation may be necessary before the bit allocation is applied to the subband signals. In identical manner to the one stated above for the first and second subband signal components, it may now be determined whether initial bit allocation is necessary for the combined subband signal. Starting from the original first and second subband signal components there is again determined whether an initial bit allocation for at least either of the two subband signal components is necessary. If so, a plurality of bits is allocated in advance to the signal block of the combined subband signal. If it is also possible to determine in advance whether no bits need be allocated to a signal block of a subband signal component, expansion of the concept of interaction to afore-mentioned situations (b) and (c) is necessary so as to be able to determine for the combined subband signal whether an initial bit allocation for the signal block of the combined subband signal is necessary or not, or whether no bits at all will be allocated to the signal block of the combined subband signal.

The invention will be further explained in the description of the drawing figures with reference to a number of exemplary embodiments.

BRIEF DESCRIPTION OF THE DRAWING

FIG. 1a shows the left and right subband signal components constituted by q-sample signal blocks, plotted against time;

FIGS. 3, 4 and 5 show the various allocation steps as a function of the power $v_i$ of a signal block of a subband signal component;

DESCRIPTION OF THE PREFERRED EMBODIMENT

Figure 1:
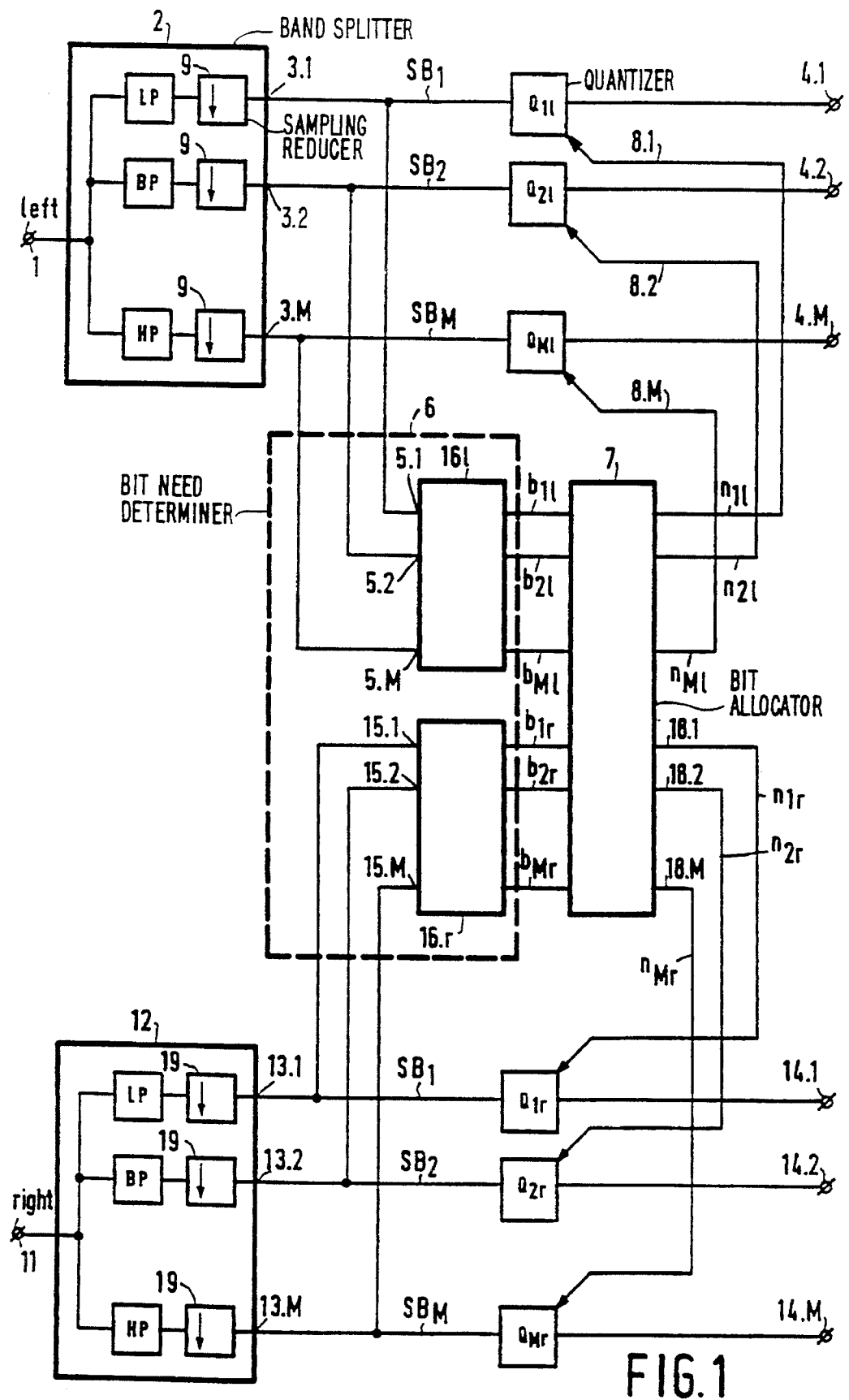
FIG. 1 shows the encoding system.

FIG. 1 shows an embodiment of the encoding system for coding a stereo audio signal. For example, 16-bit samples of the left signal component of the audio signal are applied to input 1 with a sampling frequency of 44 kHz. The audio signal is applied to a subband splitter 2. The subband splitter 2 splits up the left audio signal component into M subbands by means of a number of M filters, that is to say, a low-pass filter LP, M-2 band-pass filters BP and a high-pass filter HP. For example, M is equal to 32. The sampling frequency of the M left subband signal components is reduced in the blocks referenced 9. In these blocks the sampling frequency is reduced by a factor of M. The signals thus obtained are presented at the outputs 3.1, 3.2, . . . 3.M. At the output 3.1 the signal is presented in the lowest subband $SB_1$. At the output 3.2 the signal is presented in the lowest but one subband $SB_2$. At the output 3.M the signal is presented in the highest subband $SB_M$. The signals at the outputs 3.1 to 3.M have the form of successive samples expressed in 16 or over, for example 24-bit numbers. The samples of the left subband signal component thus appear at the outputs 3.1 to 3.M in FIG. 1. These samples are referenced 1[k].

16-bit samples of the right signal component of the audio signal are presented with a 44 Khz sampling frequency at output 11. The signal is applied to a subband splitter 12 which distributes the right audio signal component over M subbands by means of M filters which are identical with the filters in the splitter 2 as regards their filtering function. Subsequently, the sampling frequency of the M right subband signal components is reduced in the blocks referenced 19. The signals thus obtained are presented at the outputs 13.1 to 13.M. At the output 13.1 there is again available the signal from the lowest subband $SB_1$ and at the output 13.M the signal from the highest subband $SB_M$. The signals are also in the form of samples having identical numbers of bits with the signals presented at the outputs 3.1 to 3.M of the splitter 2. The samples are referenced r[k].

FIG. 1a shows the two signal components in each subband plotted against time. The signal stream of the successive samples in the two signal components in each subband are combined to q-sample corresponding time-equivalent signal blocks as is apparent from FIG. 1a. For example, q is equal to 12.

In the present embodiment the subbands $SB_1$ to $SB_M$ have all identical widths. This is not necessary, however. The prior-art publication (4), Krasner, discusses, for example, a subdivision into a number of subbands whose bandwidths approximately correspond to the bandwidths of the critical bands of the human auditory system in the respective frequency ranges.

The operation of the subband splitters 2 and 12 will not be further discussed, because their operation has already been extensively discussed. To this end reference should be made to prior-art documents (1), (4) and (5) which are considered included in this application where deemed necessary.

The corresponding signal blocks of q successive samples of the left subband signal components are applied to the associated quantizers $Q_{11}$ to $Q_{M1}$. In a quantizer $Q_{m1}$ the samples in a signal block are quantized to quantized samples comprising a number of bits $n_{m1}$ smaller than 16.

Similarly, the corresponding signal blocks of the right subband signal components are applied to the associated quantizers $Q_{1r}$ to $Q_{Mr}$. In a quantizer $Q_{mr}$ the samples in a signal block are quantized to quantized samples comprising a number of bits $n_{mr}$ smaller than 16.

Prior to quantization, the q samples in a signal block are first normalized. This normalization is effected by dividing the amplitudes of the q samples by the amplitude of the sample having the largest absolute value in the signal block. The amplitude of the sample having the largest amplitude in the signal block provides the scale factor SF, cf. document (2). Subsequently, the amplitudes of the normalized samples, which are now situated in an amplitude range from −1 to +1, are quantized.

In prior-art document (2) this quantization is extensively discussed, cf. FIGS. 24, 25 and 26 and the associated descriptions in that document.

The quantized samples of the left signal components in the subbands $SB_1$ to $SB_M$ are thereafter presented at the respective outputs 4.1 to 4.M. The quantized samples of the right signal components in the subbands $SB_1$ to $SB_M$ are presented at the respective outputs 14.1 to 14.M.

The outputs 3.1 to 3.M are further coupled to the respective inputs 5.1 to 5.M of the unit 16.1 belonging to the bit need determining means 6. Furthermore, the outputs 13.1 to 13.M are coupled to the respective inputs 15.1 to 15.M of a unit 16.r belonging to the bit need determining means 6. The units 16.1 and 16.r determine the bit needs $b_{m1}$ and $b_{mr}$ for q-sample signal blocks corresponding with time of the left and right subband signal components in the subbands $SB_1$ to $SB_M$. The bit needs $b_{m1}$ and $b_{mr}$ are numbers related to the number of bits with which the q samples in a q-sample signal block of the left and right signal components of a subband-m signal ought to be quantized.

The bit needs $b_{11}$ to $b_{M1}$, and $b_{1r}$ to $b_{Mr}$ derived by the bit need determining means 6 are applied to the bit allocation means 7. The bit allocation means 7 determine, on the basis of the bit needs, the real numbers of bits $n_{11}$ to $n_{M1}$ and $n_{1r}$ to $n_{Mr}$ with which the q samples of the corresponding signal blocks of the left and right subband signal components in the subband signals $SB_1$ to $SB_M$ are quantized. Control signals corresponding to the numbers $n_{11}$ to $n_{M1}$ are applied to the respective quantizers $Q_{11}$ to $Q_{M1}$ over the lines 8.1 to 8.M, so that the quantizers are capable of quantizing the samples of the left signal components with the correct numbers of bits. Control signals corresponding to the numbers of $n_{1r}$ to $n_{Mr}$ are applied to associated quantizers $Q_{1r}$ to $Q_{Mr}$, over the lines 18.1 to 18.M, so that also these quantizers are capable of quantizing the samples of the right signal components with the correct numbers of bits.

The documents (6a) and (6b) of the list of references extensively discuss how the bit need determining means 6 and the bit allocation means 7 may function, and characteristics of the samples in a signal block on which the determinations may be based.

The documents (6a) and (6b) explain how the powers $v_{m1}$ and the magnitudes $w_{m1}$ may be derived from the samples in the corresponding signal blocks of the left subband signal components, and how the bit needs $b_{m1}$ may be derived from the magnitudes $w_{m1}$ and the scale factors $SF_{m1}$. The magnitude $w_{m1}$ then represents the power of the masked quantization noise in a signal block of the left subband signal component in the subband $SB_m$. Similarly, the unit 16.r derives the powers $v_{mr}$ and the magnitudes $w_{mr}$ from the samples in the corresponding signal blocks of the right subband signal components, and the bit needs $b_{mr}$ from the magnitudes $w_{mr}$ and the scale factors $SF_{mr}$. The magnitude $w_{mr}$ then represents the power of the masked quantization noise in a signal block of the right subband signal component in the subband $SB_m$.

The documents then describe the bit allocation as performed in the bit allocation means 7. The bit allocation is mainly described for a mono signal. In the described bit allocation algorithm the available number of bits B, starting from the calculated bit needs $b_1$ to $b_M$, are distributed over the samples in the corresponding signal blocks in the subbands so as to obtain the magnitudes $n_1$ to $n_M$. In the described method always the largest bit need $b_i$ is determined in a number of cyclic steps, after which a number of bits p per sample are allocated to the signal block in the subband $SB_i$. In the event of bits being allocated to the signal block in the subband $SB_i$ for the first time, p is equal to, for example, 2. If bits are again allocated to the signal block in the subband i at a later stage, p will have a smaller value. For example, p will then be equal to 1.

Above documents also describe that stereo signals may be processed by the bit allocation means 7. In that case there are two options. The first option is as follows.

In this option the bit allocation is separately performed for the left and right subband signal components. In the method discussed previously, the value of B was used for the bit allocation. B was then equal to the number of available bits. It may be evident that in the present case just half the number of available bits are taken for B for the calculation of $n_{11}$ to $n_{M1}$. The other half of the number of available bits will be used for the bit allocation to the right subband signals for obtaining the values $n_{1r}$ to $n_{Mr}$.

In contradiction of the first option, in which there were separate bit allocations for the left and right subband signals, in the second option the 2M bit needs $b_{11}$ to $b_{M1}$ and $b_{1r}$ to $b_{Mr}$ are applied to a bit allocation unit similar to unit 7. In this unit the 2M numbers of $n_{11}$ to $n_{M1}$ and $n_{1r}$ to $n_{Mr}$ are derived from the real number of available bits B in a manner similar to that described in the two documents with respect to mono signals.

Said documents (6a) and (6b) describe an embodiment of determining means as included in the encoding system. With these determining means there is a possibility that an initial bit allocation to signal blocks may be performed in several subbands. Reference be made to the description of the FIGS. 11 to 14 in said documents. Said documents describe how for successive time intervals, in which corresponding signal blocks of the subbands are coded, it may be determined, on the basis of the powers of $v_1$ to $v_m$ and the magnitudes $w_1$ to $w_M$, that initial bit allocation is to be performed for a signal block or that no initial bit allocation must take place, or that no bits at all need to be allocated to the signal block.

Naturally, the described method could be applied to each separate subband signal component to be thus in a position to establish for the stereo signal whether an initial bit allocation is necessary or not and whether perhaps no bits at all need to be allocated to a signal block.

Figure 2:
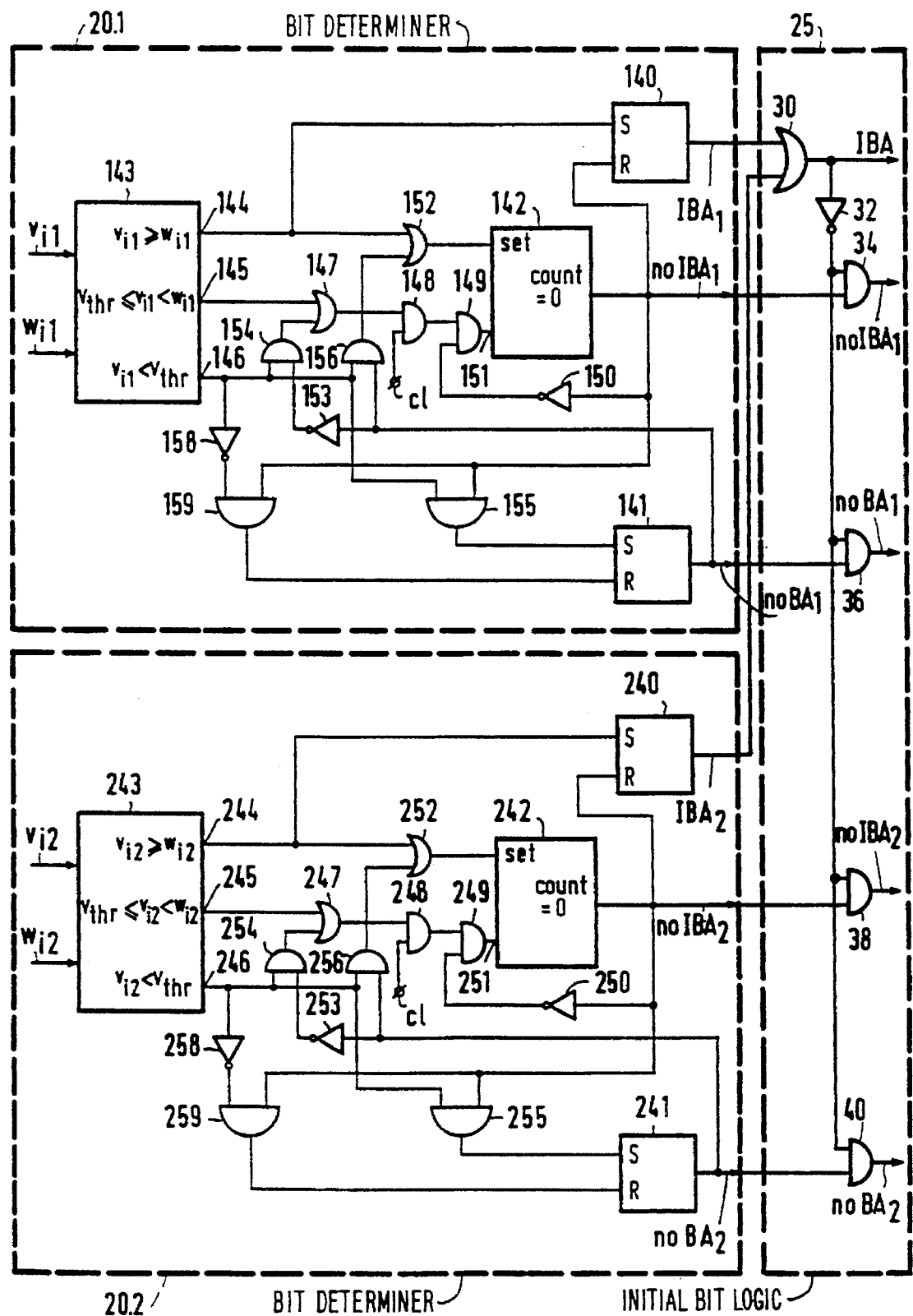
FIG. 2 shows a first embodiment of the determining means.

FIG. 2 shows an embodiment of the determining means according to the invention. The embodiment comprises two sections 20.1 and 20.2 denoted by dashed lines. The two sections are identical. A section, for example, section 20.1 has already been described and shown in above documents, cf. the description of FIG. 11 in these documents. A description of the operation of the section 20.1 will be given hereinbelow. This description will be based on the situations represented in the FIGS. 3, 4 and 5 of the present application.

Figure 5:
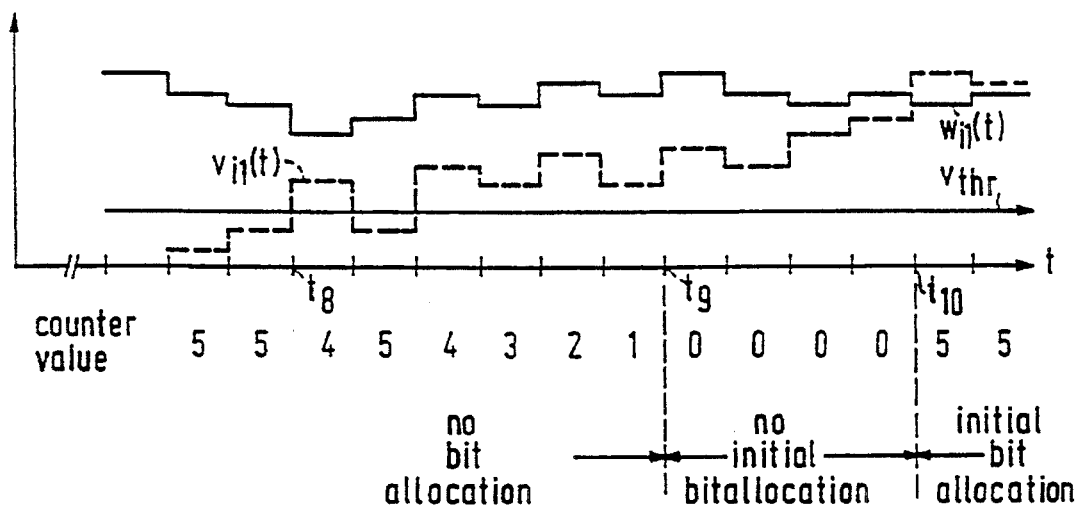

FIGS. 3, 4 and 5 show the situations for the successive signal blocks of the subband signal component in a subband i to which bits are allocated in advance or not to the subband signal component. The drawing Figures show the successive time intervals ΔT in which corresponding signal blocks of the M subbands are processed. In each time interval the power $v_i(t)$ and the magnitude $w_i(t)$ are determined for each subband signal component in each subband $SB_i$. For the first subband signal component in the subband $SB_i$ the magnitudes $v_{i1}$ and $w_{i2}$ are computed. If $v_{i1}(t)$ exceeds $w_{i1}(t)$, bits are allocated in advance to the first subband signal component in the subband $SB_i$. As is apparent from FIG. 3, this holds for the time intervals prior to $t=t_1$. FIG. 2 shows in section 20.1 a circuit by which control signals can be derived from the magnitudes $v_{i1}$ and $w_{i1}$, which signals denote that initial bit allocation is to be performed for the first subband signal component in which case the output of the SR flip-flop 140 is either "high" or "logic 1", or that no bit allocation is performed in which case the output of the SR flip-flop 141 is "high", or that no initial bit allocation is performed in which case the output of the counter 142 is "high". In the latter case, bits may be allocated indeed to the first subband signal component, but this allocation is then performed at a later stage, i.e. in the block 54 and perhaps also in the block 56 according to the method shown in FIG. 5 of above documents.

At the instant $t=t_1$, $v_{i1}(t)$ becomes smaller than $w_{i1}(t)$. The output 144 of the comparator 143 now becomes "low", whereas the output 145 of this comparator becomes "high". This "high" signal is applied through the OR gate 147 to the AND gate 148, so that clock pulses are passed to the AND gate 149 with a frequency f equal to $1/\Delta T$. Since a "high" signal is applied to the other input of the AND gate 149 through the inverter 150, the clock pulses are passed to the input 151. In response to the clock pulses the counter 142 now counts down from the initial count of 5 (decimal), cf. FIG. 3. Since the output of counter 142 remains low, the position of the flip-flop 140 does not change, so that the initial bit allocation is maintained.

A time interval later, $v_{i1}(t)$ exceeds $w_{i1}(t)$. The output 144 of the comparator 143 becomes "high" again which means that the ascending edge is applied to the set input of the counter 142 via the OR gate 152. The count of the counter 142 is again set to 5 (decimal). At the instant $t_2$, cf. FIG. 3, $v_{i1}(t)$ becomes smaller than $w_{i1}(t)$. $v_{i1}(t)$ now remains smaller than $w_{i1}(t)$ sufficiently long to permit counter 142 counting back to the count of 0 (decimal). This is at the instant $t=t_3$, cf. FIG. 3. At this instant the output of the counter 142 becomes "high". The flip-flop 140 is reset now. The inverter 150 and the AND gate 149 block the counting of the counter 142 so that the counter retains the count of 0.

Bits are now no longer allocated to the first subband signal component in advance. At the instant $t=t_4$, $v_{i1}(t)$ again exceeds $w_{i1}(t)$. The counter 142 is reset to the count of 5 and, additionally, the flip-flop 140 is set, so that bits are initially allocated again.

FIG. 4a shows the situation in which $v_{i1}(t)$ drops below a certain threshold $v_{thr}$ even before the counter 142 has counted down to "0". At the instant $t=t_5$ the output 145 of the comparator 143 becomes "low" again and the output 146 "high". Because the inverter 153 applies a "high" signal to one input of the AND gate 154, the "high" signal at the output 146 is passed to the AND gate 148 via AND gate 154 and the OR gate 147. The counter 142 continues to count. The initial bit allocation phase is thus maintained until the count of 0 (decimal) is reached. The output of the counter 142 now briefly rises. Consequently, the flip-flop 141 is set via the AND gate 155. The high output signal of the flip-flop 141 is fed via the AND gate 156 and the OR gate 152 to the set input of the counter 142 which thereupon jumps to the count of 5 (decimal). In addition, the further down-counting of the counter 142 is blocked because the inverter 153 now applies a "low" signal to the one input of the AND gate 154. From the instant $t_6$ onwards no bits at all are allocated to the first subband signal component.

FIG. 4b shows the situation in which $v_{i1}(t)$ has remained in the area between $v_{thr}$ and $w_{i1}(t)$ for a sufficiently long period of time, so that the "non-initial bit allocation" phase has commenced. At the instant $t_7$, $v_{i1}$ becomes smaller than $v_{thr}$. At this instant the output 145 becomes "low" and the output 146 becomes "high"

At this instant the flip-flop 141 is set via the AND gate 155 and the counter 142 is reset to the count of 5 via the AND gate 156 and the OR gate 152. The output of the counter 142 thus becomes "low" while the output of the flip-flop 141 becomes "high" again. No bits are allocated to the first subband signal component.

FIG. 5 shows the situation in which $v_{i1}(t)$ augments again. At the instant $t_8$, $v_{i1}(t)$ exceeds $v_{thr}$. The output 145 now becomes "high" so that the counter 142 is allowed to count down now. A time interval later $v_i(t)$ is again smaller than $v_{thr}$. The output 146 becomes "high" again so that the counter is reset to the count of 5 via the AND gate 156 and the OR gate 152. If $v_i(t)$ exceeds $v_{thr}$ for a sufficiently long period of time, the counter 142 may count down to the count of zero. At $t=t_8$ the output of the counter 142 becomes "high". The flip-flop 141 is reset via the AND gate 159 which is supplied with a "high" signal via the inverter 158, so that at this moment the "no bit allocation" phase is terminated and a phase of "no initial bit allocation" is changed to.

So far as regards the description of the operation of the section 20.1. The operation of the section 20.2 is completely identical. The circuit of the section 20.2 is identical with that of section 20.1, the reference numerals of like components in the sections 20.1 and 20.2 commencing with a 1 or 2 respectively, but further having like values. With the described operation, the sections 20.1 and 20.2 could thus separately determine for the first or second subband signal component respectively, what sort of initial bit allocation phase is necessary for the two subband signal components. However, according to the invention, an interaction is introduced which is realized. By the circuit referenced 25. The circuit 25 comprises an OR gate 30 which is supplied with the output signals of the flip-flops 140 and 240 both denoting the "initial bit allocation phase" for the two subband signal components in the subband $SB_1$. The output signal IBA of the OR gate 30, if "high", denotes that a phase of initial bit allocation is valid for the two subband signal components. This is the case if either the flip-flop 140 or the flip-flop 240 or both flip-flops have a "high" output signal. The output of the OR gate 30 is coupled to an input of AND gates 34, 36, 38 and 40 via an inverter 32. If the output of the OR gate 30 is "high", the AND gates 34, 36, 38 and 40 are blocked via inverter 32 and then have a "low" output signal.

The output of the counter 142 is coupled to a second input of the AND gate 34. The output of the counter 242 is coupled to a second input of the AND gate 38. The output of the flip-flop 141 is coupled to a second input of the AND gate 36 and the output of the flip-flop 241 is coupled to a second input of the AND gate 40.

If the outputs of the flip-flops 140 and 240 are "low", the output of the counter 142 or the flip-flop 141 is "high", the output of the counter 242 or the flip-flop 241 "high" and the output of the OR gate 30 "low". The AND gates in the circuit 25 are unblocked now and may allow the signals at the outputs of the counters 142 and 242 and at the outputs of the flip-flops 141 and 241 to pass as respective control signals "no IBA1", "no IBA2", "no BA1" and "no BA2". If the output of either AND gate 34 or 38 is "high", this means that no initial bit allocation is performed for the first or second subband signal component respectively, but that perhaps during the later bit allocation, bits might be allocated to the subband signal component in question. If the output of either AND gate 36 or 40 is "high", this means that no bit allocation whatsoever is performed for the first or second subband signal component respectively.

The determining means shown in FIG. 2 may be included in the unit 6 in the system shown in FIG. 1. In that case there are five signal lines leading from the unit 6 to the unit 7 per subband, over which lines the output signals of the OR gate 30 and the AND gates 34, 36, 38 and 40 may be transported to the unit 7. Alternatively, the determining means may be included in the unit 7. In that case there are four signal lines per subband between the unit 6 and unit 7 over which lines the magnitudes $v_{i1}$, $w_{i1}$, $v_{i2}$ and $w_{i2}$, which are determined for each subband in the unit 6, may be transported to the determining means.

In the unit 7 the correct initial bit allocation is performed to the signal blocks in the subbands while the control signals of the determining means are taken into consideration.

Figure 6:
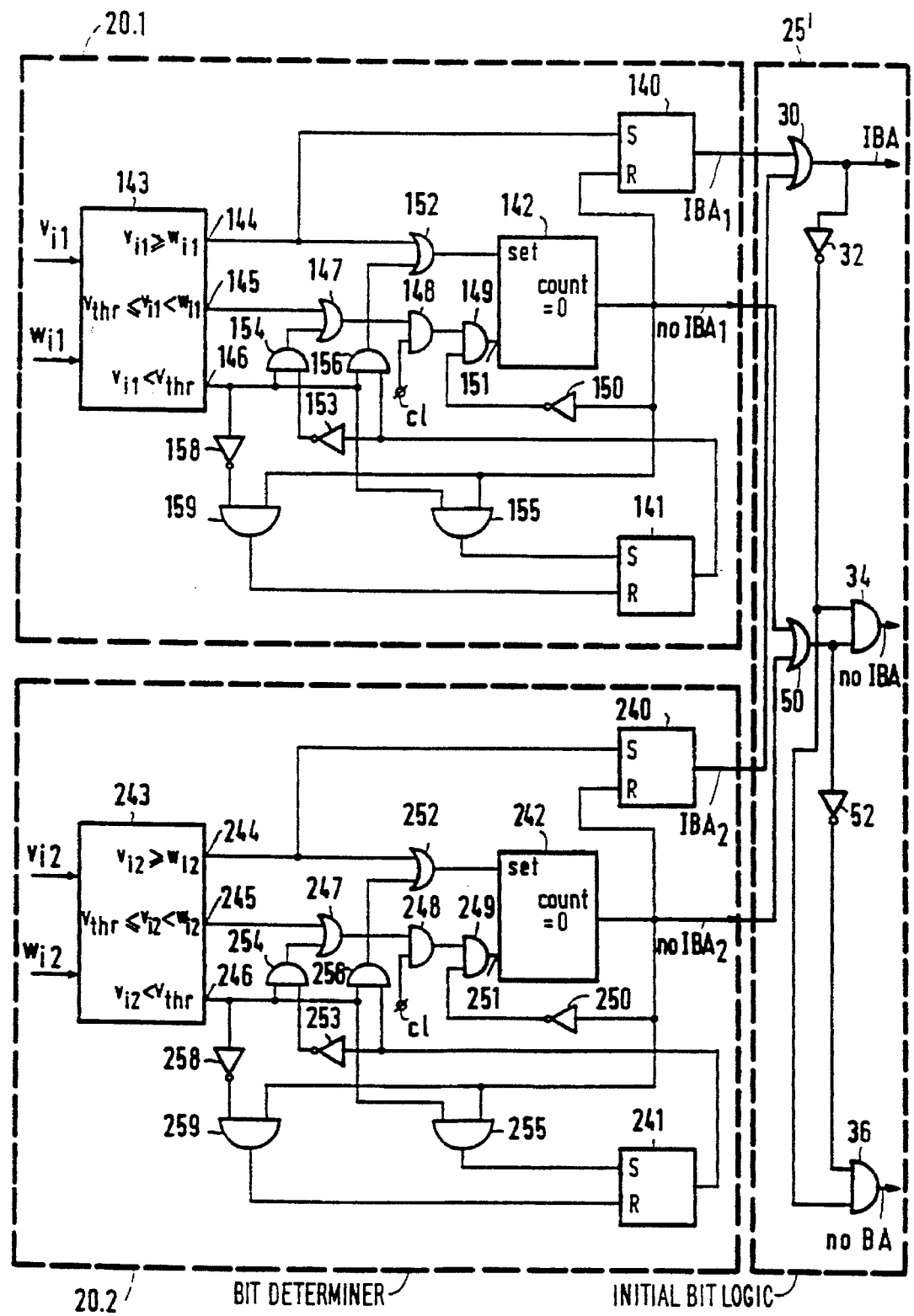
FIG. 6 shows a second.

FIG. 6 shows a second embodiment which has a great similarity to the embodiment shown in FIG. 2. The determining means shown in FIG. 6 again comprise the sections 20.1 and 20.2. The section 25, however, is of a different structure here and is thus referenced 25'. The control signal IBA for the initial bit allocation to the two subband signal components of the subband $SB_i$ is derived by the section 25' in identical manner with FIG. 2, that is, by means of the OR gate 30. The section 25' further includes an OR gate 50 in which the output signals of the counters 142 and 242 are combined. The output of the OR gate 50 is coupled to an input of the AND gate 34 and coupled to an input of the AND gate 36 via an inverter 52. Furthermore, the output of the OR gate 30 is coupled to a second input of the AND gates 34 and 36 via the inverter 32.

If the output of the OR gate 30 is "low", the AND gate 34 is unblocked and the signal of the OR gate 50 may be passed via the AND gate 34. If this "no IBA" signal is "high", this denotes that no initial bit allocation to the signal blocks of the two subband signal components is performed. If the outputs of the two OR gates 30 and 50 are "low", the signal at the output of the AND gate 36 becomes "high", so that in that case not a single bit is allocated to the signal blocks of the two subband signal components.

A third embodiment not shown in a drawing Figure will be briefly discussed here. This third embodiment shows much similarity to the embodiment shown in FIG. 2, with the exception that the section 25 is absent and a maximum value determinator is substituted for this section. The maximum value determinator is supplied with the count of the counter 142 through a first input and with the count of the counter 242 through a second input. The maximum value determinator determines the higher of the two counts and presents this at an output. This output is coupled to the load inputs of the counters 142 and 242. After each encoding operation, that is to say, after each time interval $\Delta T$, the higher of the two counts is stored in both counters. The output signals IBA1 and IBA2 are now always identical. The same holds for the output signals "no IBA1" and "no IBA2" and "no BA1" and "noBA2" respectively.

Figure 7:
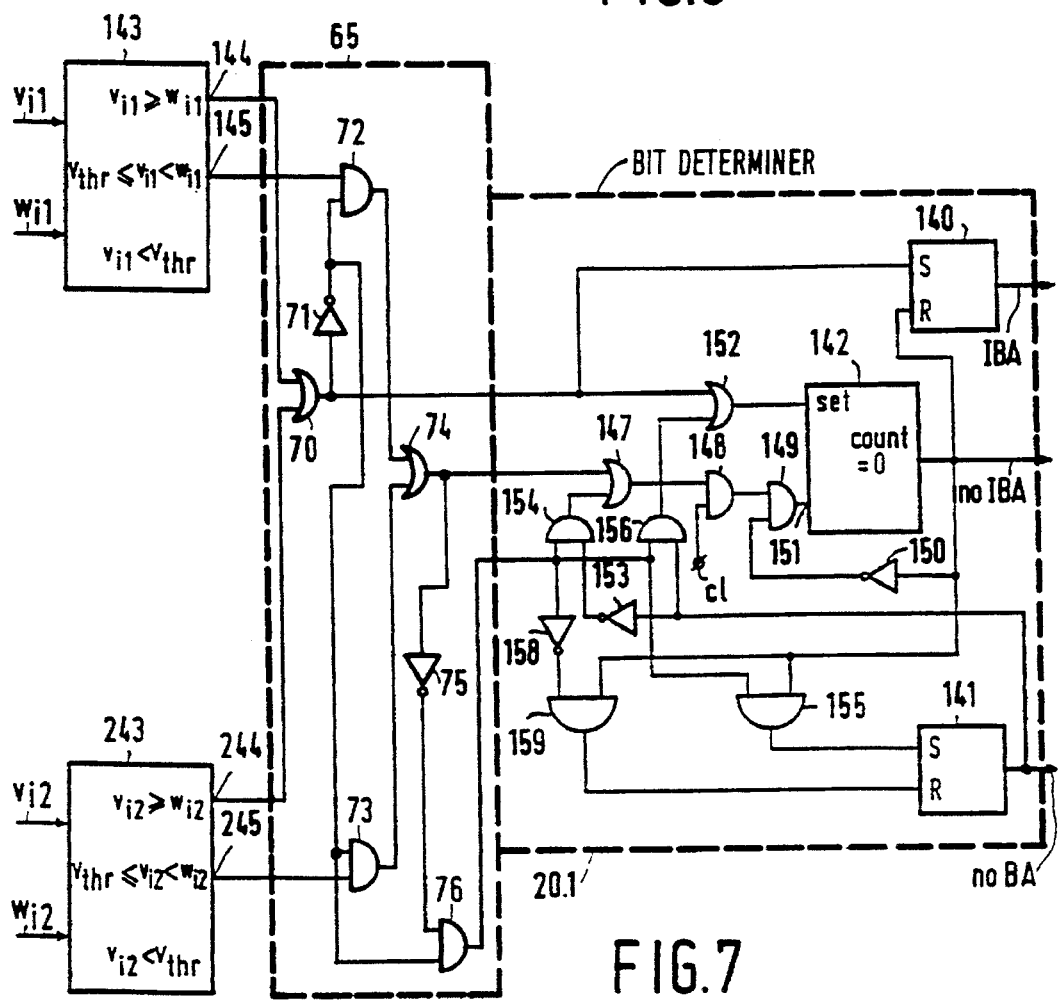
FIG. 7 shows a third embodiment of the determining means.

FIG. 7 shows yet another embodiment. The comparators 143 and 243 are again identical with the comparators having like reference numerals in FIG. 2. The determining means shown in FIG. 7 further include the section 20.1 of FIG. 2. A coupling means 65 is inserted between the comparators 143 and 243 and the section 20.1. The outputs 146 and 246 of the comparators 143 and 243 are not used in this structure. The outputs 144 and 244 of the comparators 143 and 243 are combined in the OR gate 70. The output of the OR gate 70 is coupled to the OR gate 152, on the one hand, and, on the other hand, via an inverter 71, to a first input of AND gates 72, 73 and 76. The outputs 145 and 245 of the comparators 143 and 243 respectively, are coupled to a second input of the AND gates 72 and 73 respectively. The outputs of these AND gates 72 and 73 are combined in an OR gate 74. The output of the OR gate 74 is coupled, on the one hand, to an input of the OR gate 147 and, on the other hand, via an inverter 75, to a second input of the AND gate 76. The output of this AND gate 76 is coupled to the inverter 158 and the AND gates 154 and 156. The outputs of the flip-flops 140 and 141 and of the counter 142 now produce direct the control signals "IBA", "no BA" and "no IBA" which may be used for the bit allocation in the determining means.

Figure 8:
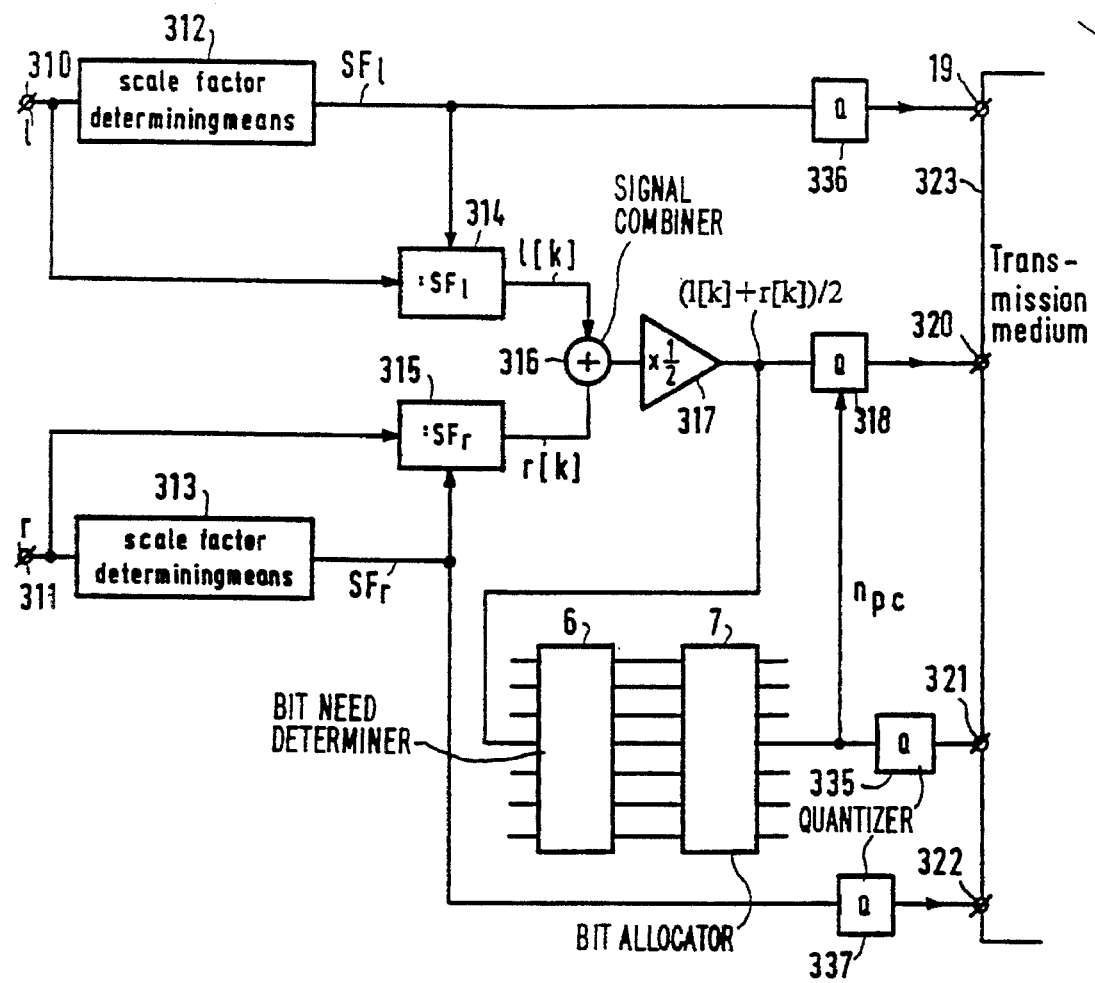
FIG. 8 shows a system for coding first and second subband signal components in a subband $SB_p$ in an intensity mode.
Figure 8:
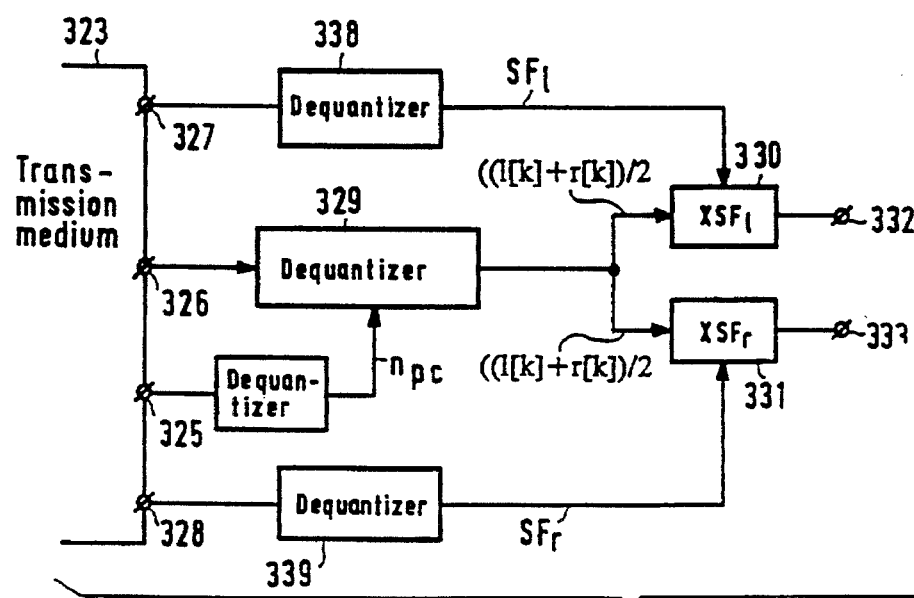

FIG. 8 shows the section of the encoding system in which the two subband signal components in a subband can be coded in an intensity mode. q-sample signal blocks of the first subband signal component in the subband $SB_p$ are applied to the input terminal 310. q-sample signal blocks of the second subband signal component, that is, the right subband signal component in the subband $SB_p$ are applied to input terminal 311. The left subband signal component referenced 1 is applied to a unit 312 as well as a divider 314. In the unit 312 a scale factor $SF_l$ determined for each signal block in the left subband signal component. This scale factor is, for example, equal to the amplitude of the largest sample in the signal block. In the divider 314 all the samples in the signal block are divided by the scale factor $SF_l$. Normalized samples referenced l[k] where k varies from 1 to q, then appear at the output of divider 314. The samples l[k] are applied to a first input of a signal combining unit 316 arranged as an upcounter. The right subband signal component referenced r is applied both to a unit 313 and a divider 315. In the unit 313 a scale factor $SF_r$ is determined for each signal block in the right subband signal component, which scale factor is in this case also equal to the amplitude of the largest sample in the signal block. In the divider 315 all the samples of the signal block are divided by the scale factor $SF_r$. At the output of the divider 315 normalized samples r[k] appear which are applied to a second input of the signal combining unit 316. Also in this case k varies from 1 to q. In an additional divider 317 the summed samples l[k]+r[k] are divided by 2. The samples thus obtained are applied to the quantizer 318.

The bit need determining means 6 and the bit allocation means 7 determine the manner in which the number of bits $n_{pc}$ by which the samples in the signal block of the combined subband signal in the subband $SB_p$ are to be represented in the manner as described, for example, in the documents (6a) and (6b). The combined subband signal block quantized in the quantizer 318 is then applied to the input 320 of a transmission medium 323. Also the scale factors $SF_l$ and $SF_r$ belonging to the associated signal blocks of the left and right subband signal components are applied, subsequent to quantization in the quantizers 336 and 337, to the inputs 319 and 322 respectively, of the transmission medium 323. Furthermore, the allocation information $n_{pc}$ representing the number of bits by which the samples in the sample block of the quantized combined subband signal are represented are applied, subsequent to quantization in the quantizer 335, to the input 321 of the transmission medium 323. The method described hereinbefore is repeated for successive corresponding signal blocks in the left and right signal components of the subband $SB_p$.

The transmission medium 323 may have the form of a wireless transmission, such as, for example, a radio transmission channel. However, different transmission mediums are also possible. In this respect one may think of optical transmission, for example, through optical fibres or optical record carriers such as compact disc-like mediums or a transmission by means of magnetic record carriers for which, for example, RDAT or SDAT-like recording and reproducing techniques are used.

At the receiver end of the transmission medium 323 the q-sample signal block of the combined subband signal in the subband $SB_p$ is derived from the data stream of the quantized samples also applied to the dequantizer 329 via the input 326 under the influence of the allocation information $n_{pc}$ applied to a dequantizer 329 via the input 325. This method is extensively discussed in document (2) in the list of references. The samples thus obtained are then applied to multipliers 330 and 331. The scale factor information is also derived from the data stream applied to the receiver via the transmission medium 323. This scale factor information comprises the scale factors $SF_l$ and $SF_r$ which are also applied to the multipliers 330 and 331 respectively via the inputs 327 and 328. In the multipliers 330 and 331 the samples in the signal block of the combined subband signal are multiplied by $SF_l$ and $SF_r$ respectively. Left and right subband signal components in the subband $SB_p$ then appear at the respective outputs 332 and 333.

The determining means used in this system may be those used in FIG. 6 or 7. In a more general context the following may be observed.

If the determining means have only the option of performing an initial bit allocation or not, this means that for coding first and second subband signal components in a subband $SB_p$ in an intensity mode, only determining means are usable which generate two control signals, that is, the signals "IBA" and "no IBA", which then determine the bit allocation for the combined subband signal.

If the determining means have the options of an initial bit allocation (IBA), no initial bit allocation (no IBA) or no bit allocation (no BA), this means that for coding first and second subband signal components in a subband $SB_p$ in an intensity mode, only determining means may be used that generate three control signals, that is, the signals "IBA", "no IBA" and "no BA" which then determine the bit allocation for the combined subband signal.

In the embodiments discussed hereinbefore it has been assumed that in all cases it was a matter of coding a wideband digital signal constituted by first and second signal components, for example a stereo signal constituted by a left and a right signal component. The wideband digital signal, however, may also be constituted by three or more signal components. With three signal components one may think of a left, a centre and a right component. The left and right signal components may be (central frequency and) high-frequency signals to be applied to (central frequency and) high-frequency loudspeakers arranged in a stereo set-up. The central signal component may then be the sum of the low-frequency left and right signal components which may be applied to a woofer which is arranged, for example, in a centre position between the stereo (central frequency and) high-frequency loudspeakers. With four signal components one may think of, for example, a quadraphonic signal.

Applying the invention to a wideband digital signal comprising three (left, centre, right) signal components may mean that if the first control signal is generated for the left signal component, bits are allocated in advance to the corresponding signal blocks of the left and right signal components in the subband irrespective of the bit need belonging to the right signal component, or bits are allocated in advance to all three of the corresponding signal blocks, that is to say, also to the corresponding signal block of the centre signal component irrespective of the bit needs the right and centre signal components have.

In the first case there is interaction between the left and right signal components and these signal components may then be handled in the manner described above for a stereo signal. The centre signal is then independent thereof. The decision about what type of bit allocation is to be used for this signal component may then be made in the manner described in reference (6a).

In the second case there is interaction between the three signal components. The method for a stereo signal described in this application may be simply extended so that these three signal components can be coded by means of the encoding system according to the invention.

If the wideband digital signal is constituted by four signal components, such as, for example, in a quadraphonic signal, comprising a first signal component (left front), a second signal component (right front), a third signal component (left back) and a fourth signal component (right back), four different interactions are possible.

A first possibility is an interaction between all four signal components in that sense that if initial bit allocation is necessary for one of the signal components, initial bit allocation is also applied to the remaining three signal components irrespective of the bit needs these three remaining signal components have.

A second possibility is that an interaction identical with the interaction described above for the coding of a stereo signal takes place between the first and second signal components. The third and fourth signal components are independent thereof. The decision about what type of bit allocation to each of these signal components is to take place may then again be made in the manner described in reference (6a).

A third possibility is that a first interaction takes place between the first and second signal components, and a second interaction between the third and fourth signal components. The two interactions may be independent of each other and are each identical with the interaction as described above for the coding of a stereo signal.

In all cases the afore-described circuits may simply be extended, so that a wideband digital signal constituted by four signal components can be coded.

References (1) European Patent Application No. 289 080 to which U.S. Pat. No. 4,896,362 corresponds (2) European Patent Application No. 402 973 to which U.S. patent application Ser. No. 07/532,462 corresponds (3) Dutch Patent Application No. 91.00.173 to which U.S. patent application Ser. No. 07/829,789 corresponds (4) IEEE ICASSP 80, Vol. 1, 327–331, Apr. 9–11, 1980 M. A. Krasner "The Critical Band Coder . . . Digital Encoding of Speech Signals Based on the Perceptual Requirements of the Auditory System".

(5) European Patent Application No. 89 201 408.5 to which U.S. Pat. No. 5,214,678 corresponds; and U.S. patent application Ser. No. 08/144,092 which is an indirect continuation thereof, corresponds (6a) Dutch Patent Application No. 90.01.127 to which U.S. patent application Ser. No. 07/620,971 corresponds (6b) Dutch Patent Application No. 90.01.128 to which U.S. patent application Ser. No. 07/621,693 corresponds

We claim:

1. An encoding system, for encoding a digital information signal having a first signal component and a second signal component, comprising subband coding means for generating (a) a first subband signal in response to the first signal component, the first subband signal including a first signal block of q samples of the first subband signal, where q is a positive integer, and (b) a second subband signal in response to the second signal component, the second subband signal including a second signal block of q samples of the second subband signal, the first and the second subband signals being in a same subband and the first and second signal blocks being time-equivalent; and quantizing means for quantizing said samples in said first and second signal blocks to form first and second quantized signal blocks, said samples in said first and second quantized signal blocks being represented by $n_{m1}$ and $n_{m2}$ bits respectively, and said quantizing means comprises:

bit need means for determining a respective bit need b for said first signal block and a respective bit need b for said second signal block, said respective bit need for the first signal block being related to the number of bits by which the samples in said first signal block should be represented, and said respective bit need for the second signal block being related to the number of bits by which the samples in said second signal block should be represented, bit allocation means, responsive to the respective bit needs b for said first signal block and for said second signal block determined in the bit need means, for allocating a portion of an available quantity of bits to said samples in said first and second signal blocks to obtain the values $n_{m1}$ and $n_{m2}$ for the corresponding quantized first and second signal blocks, determining means for determining, for one block of said first and second signal blocks, whether an initial allocation of bits to the samples in said one block is to be performed in the bit allocation means irrespective of the respective bit need b of said one block determined by said bit need means; and means for producing a first control signal responsive to the determination by said determining means, said bit allocation means being responsive to said first control signal, for initially allocating a first number of bits to the samples of said one block, and for initially allocating a second number of bits to the samples of the other block of said first and second signal blocks, irrespective of the respective bit need b of said other block determined by said bit need means.

2. A system as claimed in claim 1, characterized in that said first and said second numbers are the same.

3. A system as claimed in claim 1, characterized in that said determining means evaluates each of said signal blocks to determine if said initial allocation is to be performed for at least one of said signal blocks, and said means for producing produces said first control signal if said initial allocation is to be performed for at least one of said signal blocks.

4. A system as claimed in claim 3, characterized in that said determining means comprises means for determining, for said other block, whether no bit allocation to the samples in said other block should be allocated in the bit allocation means, and means for producing a second control signal in response to said determining means determining that, for each of said first and second signal blocks, no initial allocation is to be performed, and that no bit allocation to the samples in said other block should be allocated in the bit allocation means, and said bit allocation means comprises means, responsive to said second control signal, for allocating no bits to said other block.

5. A system as claimed in claim 3, characterized in that said determining means comprises first means for determining, for said one block, whether no bit allocation to the samples in said one block need be allocated in the bit allocation means; and second means for determining, for said other block, whether no bit allocation to the samples in said other block need be allocated in the bit allocation means, and means, responsive solely to said first and second means each determining, for the respective one and other blocks, that no bit allocation need be performed, for producing a second control signal, and said bit allocation means comprises means, responsive to said second control signal, for allocating no bits to either of said first and second signal blocks.

6. An encoding system comprising a subband coder for subband digital coding of an information signal constituted by at least first and second signal components, said subband coder including:

signal splitting means, responsive to said information signal, for splitting said information signal into M successive subbands and generating digital subband signals comprising a succession of signal blocks, in a subband $SB_m$ a succession of first and second corresponding time-equivalent signal blocks respectively containing samples of first and second subband signal components related to said first and second signal components, and quantizing means for quantizing block-by-block said samples of first and second subband signal components in the subband $SB_m$ to form quantized signal blocks, said samples in one pair of corresponding quantized signal blocks in said subband $SB_m$ being represented by $n_{m1}$ and $n_{m2}$ bits respectively, said quantizing means comprising:

bit need means for determining a respective bit need b for respective signal blocks in the M subbands, said respective bit need being related to the number of bits by which said samples in said signal blocks in respective ones of the M subbands should be represented, bit allocation means, responsive to the bit needs determined in the bit need means, for allocating an available quantity of bits to respective samples in the different signal blocks in the M subbands, determining means for determining, for one signal block of said pair, whether an initial allocation of bits to the samples in said one signal block is to be performed in the bit allocation means irrespective of the bit need of said one signal block determined by said bit need means; and means for producing a first $SB_m$ control signal responsive to the determination by said determining means, said bit allocation means being responsive to said first $SB_m$ control signal, for initially allocating a first number of bits to the samples of said one signal block, and for initially allocating a second number of bits to the samples of the other block of said pair irrespective of the bit need of said other block determined by said bit need means.

7. A system as claimed in claim 6, wherein said first number and said second number are the same.

8. A system as claimed in claim 7, characterized in that said determining means evaluates each signal block of said pair to determine if said initial allocation is to be performed for one of said signal blocks of said pair, said means for producing produces said first $SB_m$ control signal if said initial allocation is to be performed for said one signal block of said pair, said determining means further comprises means for determining, for the other signal block of said pair, that no bit allocation to the samples in said other signal block should be allocated in the bit allocation means, and means for producing a second $SB_m$ control signal in response to said determining means determining that, for each signal block of said pair, no initial allocation is to be performed, and that, for said other signal block, no bit allocation to the samples in that signal block should be allocated in the bit allocation means, and said bit allocation means comprises means, responsive to said second $SB_m$ control signal, for allocating no bits to said other signal block irrespective of the bit need of said other signal block.

9. A system as claimed in claim 7, characterized in that said determining means evaluates each signal block of said pair to determine if said initial allocation is to be performed for at least one of said signal blocks of said pair, and said means for producing produces said first $SB_m$ control signal if said initial allocation is to be performed for at least one signal block of said pair.

10. A system as claimed in claim 9, characterized in that said determining means comprises first means for determining, for said one signal block of said pair, that no bit allocation to the samples in said one signal block need be allocated in the bit allocation means; and second means for determining, for the other signal block of said pair, that no bit allocation to the samples in said other signal block need be allocated in the bit allocation means, means for producing a second $SB_m$ control signal, responsive solely to said first and second means each determining, for the respective block of said pair, that no initial allocation is to be performed, and said bit allocation means comprises means, responsive to said second $SB_m$, control signal, for allocating no bits to either signal block of said pair irrespective of the bit need of either signal block 11. An encoding system comprising a subband coder for subband digital coding, including coding in an intensity mode, of an information signal constituted by at least first and second signal components, including:

signal splitting means, responsive to said information signal, for splitting said information signal into M successive subbands and generating digital subband signals comprising a succession of signal blocks, in a subband $SB_m$ a succession of first and second corresponding time-equivalent signal blocks respectively containing samples of first and second subband signal components related to said first and second signal components, means for combining corresponding samples of the first and second subband signal components of a subband $SB_p$, where $p \neq m$, to obtain a combined subband signal, and quantizing the combined subband signal to provide a quantized combined subband signal constituted by combined signal blocks each containing q samples, the q samples in a combined signal block of the quantized combined subband signal each being represented by $n_{pc}$ bits, and quantizing means for quantizing block-by-block the samples of first and second subband signal components in the subband $SB_m$ to form component signal blocks, the samples in a pair of corresponding component signal blocks of the first and second quantized subband signal components in said subband $SB_m$ being represented by $n_{m1}$ and $n_{m2}$ bits respectively, wherein said quantizing means comprises:

bit need means for determining a respective bit need b for respective signal blocks in the subbands, said bit need being related to the number of bits by which the samples in a signal block in a respective subband should be represented, bit allocation means, responsive to the bit needs determined in the bit need determining means, for allocating an available quantity of bits to respective samples in the different signal blocks in the M subbands, and determining means for determining, for a particular signal block of the first subband signal component in the subband $SB_m$, whether an initial allocation of a number of bits to the samples in said particular signal block is to be performed in the bit allocation means irrespective of the bit need b of particular signal block determined by said bit need means, and wherein:

for the subband $SB_p$, said determining means evaluates each signal block of an $SB_p$ pair of corresponding time-equivalent signal blocks prior to combining of the corresponding samples, and said means for producing produces a first $SB_p$ control signal if said initial allocation is to be performed for one signal block of said $SB_p$ pair, said means for combining and quantizing then combines corresponding samples of the first and second subband signal components in the subband $SB_p$ to obtain said combined subband signal which is then quantized, and said bit allocation means, responsive to said first $SB_p$ control signal, initially allocates a third number of bits to the samples of said combined subband signal.

12. A system as claimed in claim 11, characterized in that for subband $SB_p$ said determining means comprises first means for determining, for said one signal block of said $SB_p$ pair, that no bit allocation to the samples in said one signal block need be allocated in the bit allocation means; and second means for determining, for the other signal block of said $SB_p$ pair, that no bit allocation to the samples in said other signal block need be allocated in the bit allocation means, means for producing a second $SB_p$ control signal, responsive solely to said first and second means each determining, for the respective signal block of said $SB_p$ pair, that no initial allocation is to be performed, and said bit allocation means comprises means, responsive to said second $SB_p$ control signal, for allocating no bits for quantizing the combined subband signal for said $SB_p$ pair.

* * * * *